(12) United States Patent
Cisi

(10) Patent No.: US 10,018,706 B2
(45) Date of Patent: Jul. 10, 2018

(54) SYSTEM FOR ULTRASOUND LOCALIZATION OF A TOOL IN A WORKSPACE, CORRESPONDING METHOD AND PROGRAM PRODUCT

(71) Applicant: C.R.F. Societa Consortile per Azioni, Orbassano (Turin) (IT)

(72) Inventor: Alessandro Cisi, Baldichieri d'Asti (IT)

(73) Assignee: C.R.F. SOCIETA CONSORTILE PER AZIONI, Orbassano (Turin) (IT)

( * ) Notice: Subject to any disclaimer, the term of this patent is extended or adjusted under 35 U.S.C. 154(b) by 979 days.

(21) Appl. No.: 14/341,437

(22) Filed: Jul. 25, 2014

(65) Prior Publication Data
US 2015/0029825 A1 Jan. 29, 2015

(30) Foreign Application Priority Data
Jul. 25, 2013 (EP) ..................... 13177969

(51) Int. Cl.
*G01S 5/00* (2006.01)
*G01S 5/30* (2006.01)

(52) U.S. Cl.
CPC ..................... *G01S 5/30* (2013.01)

(58) Field of Classification Search
USPC ........................................ 367/117
See application file for complete search history.

(56) References Cited

U.S. PATENT DOCUMENTS

| 4,991,148 A | 2/1991 | Gilchrist |
| 6,590,834 B1 | 7/2003 | Highfill |
| 6,674,687 B2 * | 1/2004 | Zeitzew .............. G01S 7/52004 367/6 |

(Continued)

FOREIGN PATENT DOCUMENTS

| DE | 10333012 A1 | 10/2004 |
| DE | 10332457 A1 | 2/2005 |

(Continued)

OTHER PUBLICATIONS

English Machine Translation of DE 10332457 (from Espacenet).*

(Continued)

*Primary Examiner* — James R Hulka
(74) *Attorney, Agent, or Firm* — Heslin Rothenberg Farley & Mesiti P.C.; Victor A. Cardona, Esq.

(57) ABSTRACT

A method for locating a tool in a work space via ultrasound includes associating an ultrasound transmitter to a tool and calculating a position of the tool on the basis of determination of the position of the transmitter. At least three ultrasound receivers for receiving ultrasound signals from the transmitter are set in positions relative to the work space. A calculation of a position of the transmitter includes using a trilateration procedure that includes a change of reference of the positions of the receivers and is carried out to reference them in a second simplified reference system. An unknown point in the second simplified reference system is obtained. A rototranslation of the position of the unknown point obtained from the second simplified reference system is carried out into a first reference system, and a corresponding rototranslation matrix is calculated such that the unknown point is used as position of the transmitter.

15 Claims, 9 Drawing Sheets

(56) References Cited

U.S. PATENT DOCUMENTS

| | | | |
|---|---|---|---|
| 7,055,233 B1 | 6/2006 | Hofer et al. | |
| 8,355,887 B1 | 1/2013 | Harding et al. | |
| 8,370,085 B2 * | 2/2013 | Kaneyasu | B25J 13/089 |
| | | | 702/39 |
| 2003/0142587 A1 * | 7/2003 | Zeitzew | G01S 7/52004 |
| | | | 367/127 |
| 2003/0174305 A1 * | 9/2003 | Kasper | G01C 15/002 |
| | | | 356/3.09 |
| 2009/0212995 A1 * | 8/2009 | Wu | G01S 5/0278 |
| | | | 342/109 |
| 2011/0035183 A1 | 2/2011 | Kaneyasu et al. | |
| 2012/0085934 A1 * | 4/2012 | Marcelis | G01S 5/18 |
| | | | 250/491.1 |
| 2013/0208569 A1 * | 8/2013 | Pfeifer | B23K 9/095 |
| | | | 367/129 |

FOREIGN PATENT DOCUMENTS

| | | |
|---|---|---|
| EP | 1022583 A2 | 7/2000 |
| WO | 99/35511 | 7/1999 |

OTHER PUBLICATIONS

European Search Report for corresponding European Application No. 13177969.6, dated Apr. 24, 2014, completed Apr. 14, 2014.
Bertrand T. Fang: "Trilateration and Extension to Global Positioning System Navigation", Journal of Guidance, Control, and Dynamics, vol. 9, No. 6, Nov. 1986 (Nov. 1986), pp. 715-717, XP055093545, issn: 0731-5090, DOI: 10.2514/3.20169.

* cited by examiner

Fig. 3
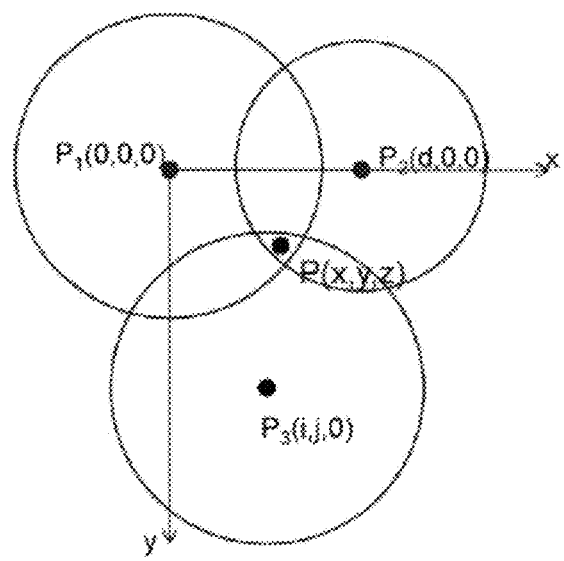
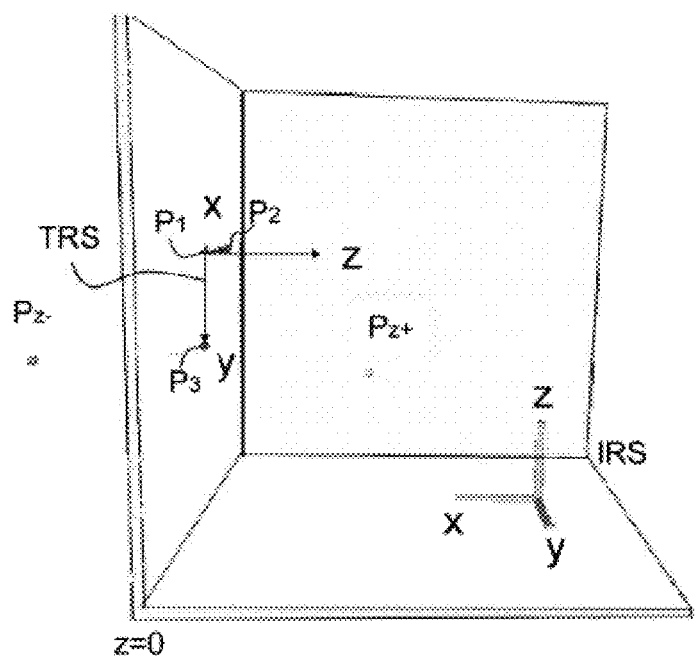
Fig. 4

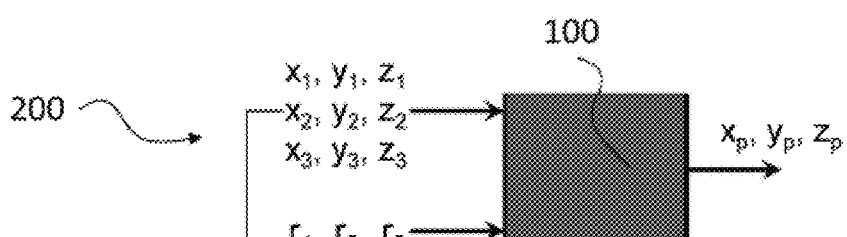
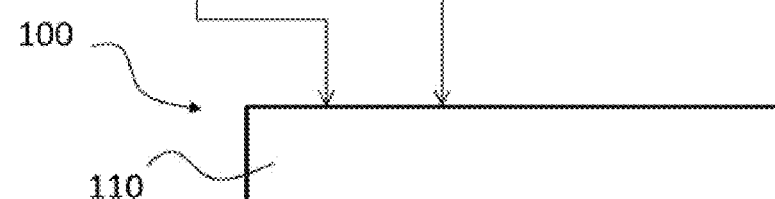
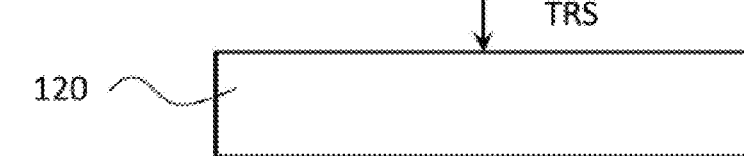
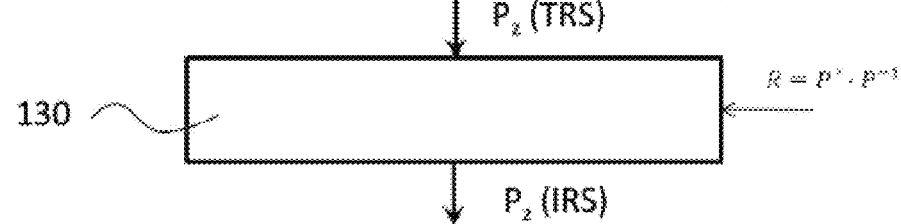
Fig. 6
Fig. 5

SYSTEM FOR ULTRASOUND LOCALIZATION OF A TOOL IN A WORKSPACE, CORRESPONDING METHOD AND PROGRAM PRODUCT

FIELD OF THE INVENTION

The present invention relates to techniques for locating a tool in a work space via ultrasound.

In what follows, understood by "tool" is a machining instrument, for example a wrench or a welding yoke, which can possibly be associated to a handling robot, but this definition is understood as being extended also to elements for handling a tool, for example a flange of the robot to which an operating end can be secured.

PRIOR ART

Known in the prior art are systems and methods for locating a tool, for example a wrench or a welding yoke in a work space via ultrasound. For example, during a process of assembly of a motor vehicle the knowledge of the position of screwing of a given screw may be useful for ensuring the quality of assembly.

There are known in particular systems and methods that adopt a plurality of receivers set in the work space and an ultrasound transmitter set on the tool or object the position of which is to be traced. For example, a system of this sort is known from the document No. DE 10333012, where a system based upon the triangulation of distances obtained from four receivers is used.

Known from the document No. EP 1 022 583 A1 is a system for locating the position of an object that displaces in interiors. The above system makes use of ultrasound transmission modules arranged on the object and a plurality of receivers arranged in space. This document mentions the use of a trilateration procedure to obtain the position of the object that displaces in interiors.

Technical Problem

The above trilateration procedure, to be implementable for calculation, presents, however, the drawback of requiring positioning of the receivers in fixed points that meet particular criteria; in particular the fixed points must lie in a reference plane associated to which is the height zero, and one of the fixed points must be positioned in the origin of the aforesaid reference system.

It is clear that the aforementioned requirements for positioning raise difficulties as regards fast, effective, and flexible arrangement of the measuring system. Moreover, errors in measurement of the position of the fixed points, necessary for measuring the distances, have a remarkable effect on the precision of identification of the position of the moving object.

OBJECT OF THE INVENTION

The object of the present invention is to propose a method of the type referred to at the start of the present description that will be able to overcome the problems referred to above and to enable a fast, effective, and flexible arrangement of the measuring system, in particular thus enabling improvement of the measuring precision and effectiveness of an associated procedure for calibrating the measuring system.

A further object of the invention is to indicate an associated procedure for measuring the positions of the fixed points located in which are the receivers that will enable a more precise measurement.

SUMMARY OF THE INVENTION

With a view to achieving the aforesaid purposes, the subject of the invention is a locating method having the characteristics of Claim 1. A further subject of the invention is a locating system according to Claim 9 and a computer-program product according to Claim 15. As used herein, the reference to such a computer-program product is understood as being equivalent to the reference to a computer-readable means containing instructions for control of the processing system in order to co-ordinate implementation of the method according to the invention. The reference to "at least one computer" is evidently intended to highlight the possibility of the present invention being implemented in modular and/or distributed form.

BRIEF DESCRIPTION OF THE DRAWINGS

Further characteristics and advantages of the invention will emerge from the ensuing description with reference to the annexed drawings, which are provided purely by way of non-limiting example and in which:

FIGS. 2 and 3 represent geometrical diagrams illustrating steps of the method according to the invention;

FIG. 4 is a schematic illustration of elements of the system of FIG. 1, in a second reference system adopted by the method according to the invention;

FIG. 5 is a flowchart illustrating operations of the method according to the invention;

FIG. 6 is a schematic diagram representing operation of the method according to the invention;

FIG. 12 is a table of values calculated and measured at particular environmental temperatures; and FIG. 13 is a table of values including offset values at various temperatures.

DETAILED DESCRIPTION OF PREFERRED EMBODIMENTS OF THE INVENTION

Figure 1:
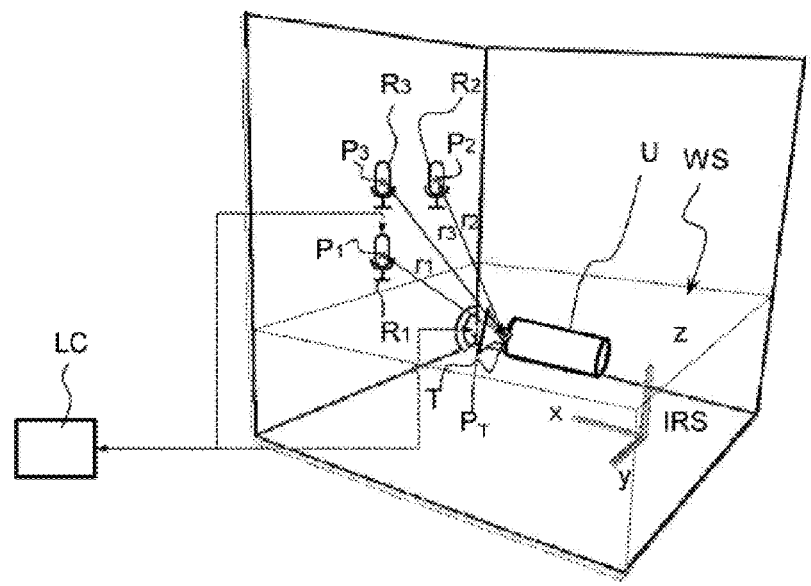
FIG. 1 is a schematic illustration of a system that implements the locating method according to the invention in a first reference system.

Represented schematically in FIG. 1 is a system for locating the position of a tool in a machining environment, which comprises an implement or tool, U, for example a wrench, which moves in a work space WS for operating on a component in pre-set positions.

The locating system in general comprises a measuring system that is configured for measuring times of flight of ultrasound signals transmitted by transmitters associated to the moving tool and received by fixed receivers so as to assess the distance between the aforesaid transmitters and receivers. A processing module is configured for calculating, on the basis of the distances measured, the position of the transmitters.

Consequently, set in a fixed position with respect to the aforesaid work space WS are receivers of ultrasound signals $R_1$, $R_2$, $R_3$. A transmitter of ultrasound signals T is associated to a part of the tool U, possibly the one closest to the tip of the tool or to an operating end thereof. The receivers $R_1$, $R_2$, $R_3$ are preferentially arranged in the proximity, but above, the work space WS in such a way that a line of view is guaranteed between them and the transmitter T during the working sequence. If the transmitter and the receiver not are in view, the time of flight is in fact longer, vitiating the measurement precision.

An electronic control module LC is provided, which controls the receivers of ultrasound signals $R_1$, $R_2$, $R_3$ and the transmitter T, and in particular controls the times of emission of the ultrasound signal by the transmitter or emitter T and the times of reception by each receiver of ultrasound signals $R_1$, $R_2$, $R_3$, thus measuring the times of flight of the ultrasound signals and calculating the distances on the basis of the speed of sound. The aforementioned electronic control module LC can be implemented in one or more computers, or even only via a microprocessor card that functions as control unit. The aforesaid control module LC may also be configured for executing the entire method forming the subject of the invention, as described in what follows.

The locating procedure, in general, preferably envisages execution of a test working cycle with the tool U, in which a plurality of different points must be reached, and calculation, for each of the above points, of the position assumed by the transmitter, recording it.

During the normal work cycle, the position of the tool U measured in the aforesaid cycle is then compared with that of the pre-recorded points (except for a tolerance to be defined case by case). The next step, according to the cases and the results of the comparison, is to decide whether to proceed to:
 recording simply information on whether the cycle is valid or not cycle (ok/nok), according to the acquired operating parameters;
 inhibiting the tool U from operating, in the case where a particular sequence is envisaged and the position reached is not the correct one.

The locating system is not in effect connected to the presence of the component on which the tool U operates, but simply records points in space, regardless of whether the component is absent, or present but in a position different from the one expected. Consequently, it is necessary for the component that is to undergo machining, during the work cycle, to be stationary and in the correct position (referenced with respect to the receivers). Moreover, the position recorded, as has been mentioned, is that of the transmitter T; it is not in general that of the tool tip, so that it is necessary for the transmitter T to be positioned as close as possible to the tip of the tool U and if possible as aligned as possible with the axis of the tool U itself.

The locating method according to the invention involves calculating the position coordinates $x_p$, $y_p$, $z_p$ of a point $P_z$ with respect to a reference triplet of axes, or reference system, that is generic; i.e., it does not have particular requirements of orientation, this point $P_z$ being associated to the position of the transmitter of ultrasound signals T, its distance $r_1$, $r_2$, $r_3$ from three fixed points $P_1$, $P_2$, $P_3$ that represent the positions in which the receivers of ultrasound signals $R_1$, $R_2$, $R_3$ are set being known, the position of the these three fixed points $P_1$, $P_2$, $P_3$ being known with respect to the same reference triplet, which is shown, for example, in FIG. 1 as first, or initial, reference system IRS.

According to a preferred version of the invention, the first, or initial, reference system IRS corresponds, in the case of a tool U actuated by a robot, to the so-called "robot triplet" or a triplet derived therefrom.

The fixed points in which the receivers are positioned number three in a minimal configuration, but it is possible to have a larger number of fixed points. In the case where there are more fixed points, i.e., more receivers of ultrasound signals, it is advantageously possible to consider all the triplets, or combinations three by three, of the set of fixed points, calculate the coordinates of the mobile point associated to the transmitter T with respect to all the triplets of fixed points available, and finally calculate a midpoint between the mobile points identified on the basis of each set of three fixed points.

The locating method according to the invention envisages using a trilateration procedure for calculating the position coordinates $(x_p, y_p, z_p)$ of the mobile point $P_z$ with respect to the initial reference system IRS, which may be any, once the distance is known between this mobile point $P_z$ and each of the three fixed points $P_1$, $P_2$, $P_3$, of which the position with respect to the same initial reference system IRS is known, calculated via the times of flight of the ultrasound signals.

Also described in what follows is a procedure for initial calibration of the ultrasound locating system. This procedure carries out minimization of the errors due to the variation in temperature (upon which the time of flight depends) and of the delays due to the electronics (due in general to the measurement hardware).

Also described is a procedure for exact measurement of the coordinates of the fixed points, where the receivers are located (with respect to an arbitrary triplet, in particular the first triplet or initial reference system IRS), upon which the precision of the subsequent measurements depends.

The aforementioned calibration procedure and procedure for measuring the positions of the fixed points comprise in one embodiment using a calibration and referencing system, comprising an ultrasound transmitter mounted on a robot, so as to objectivize the position thereof with respect to the robot triplet itself (in particular, associating to the so-called centre of flange of the robot arm, i.e., the point with respect to which the path followed by the robot arm is calculated by the respective control system) and placing the receivers in arbitrary points in space, using in particular for this purpose a generic but fixed structure, which will constrain the receivers and which, after calibration or measurement, can be transported with the receivers fixed with respect thereto, and located in the context of use.

All the movements of the robot are effected with movements exclusively along the axes of the robot triplet. In this way, the position of the flange centre of the robot may be made to coincide with the position of the transmitter. The deviations are relative, but always consistent with this triplet.

The specific trilateration procedure used by the locating method and system according to the invention is now described.

The trilateration procedure, as well as the corresponding trilateration formulas, in a general sense is a known procedure, which exploits the properties of spheres, whereby, given a point that lies on the surface of three spheres, the information on the centres of the spheres and their radii provide sufficient information for calculating the possible positions of the aforesaid point, restricting these possible positions to two, one of which can be easily excluded with simple geometrical considerations. In a system like the one described with reference to FIG. 1, we have the positions of the centres of the spheres, in the fixed points $P_1$, $P_2$, $P_3$ and the radii equal to the distances $r_1$, $r_2$, $r_3$ from the mobile point $P_z$ to be located; hence, trilateration can be applied.

Figure 11:
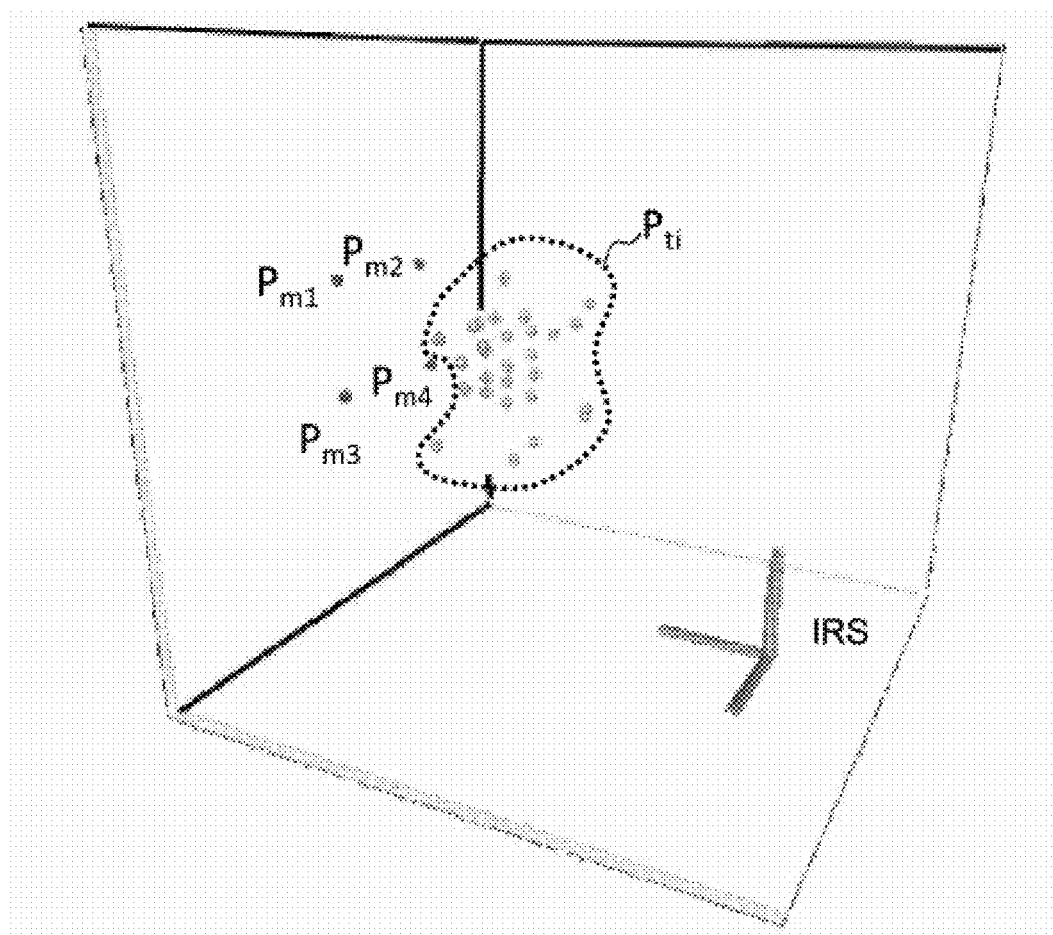

In the trilateration procedure, it is envisaged to consider as known the positions of three fixed receivers $P_1$, $P_2$, $P_3$ with respect to a reference triplet. This can be achieved through a procedure for measuring the fixed points as described in what follows with reference to FIG. 11, or via another type of measurement.

In the case provided herein by way of example, the aforesaid three positions of the fixed points $P_1$, $P_2$, $P_3$ are $$P_1(x_1,y_1,z_1)=(3307,610,1710)$$

$$P_2(x_2,y_2,z_2)=(3288,-447,2562)$$

$$P_3(x_3,y_3,z_3)=(3293,640,2607)$$

where $(x_i, y_i, z_i)$ indicates the coordinates of the i-th point $P_i$ in the first, or initial, reference system IRS, in which the measurements of the position of the fixed points $P_1$, $P_2$, $P_3$ are made. The numeric values indicate examples of effective values of the position coordinates in the initial reference system IRS in the example discussed herein.

The respective distances $r_1$, $r_2$, $r_3$ between each receiver $R_1$, $R_2$, $R_3$ and the transmitter T on the tool U can be calculated by measuring the time that has elapsed between emission of the ultrasound signal by the transmitter T and the instant of reception of the signal at a given receiver $R_1$ or $R_2$ or $R_3$.

The aforesaid distances $r_1$, $r_2$, $r_3$ are hence known via measurement of the times of flight (multiplied by the speed v of sound, as discussed hereinafter), and apply in the example discussed herein $$r_1=1561$$

$$r_2=2197$$

$$r_3=1893$$

The aim is to calculate the position $P_z$ of the transmitter T with respect to the initial reference triplet. FIG. 1, as has been mentioned, represents this initial reference triplet, designated by IRS, with the axis x pointing towards the receivers $R_1$, $R_2$, $R_3$ and the axis z pointing upwards.

A necessary condition for applying trilateration is that the three fixed points $P_1$, $P_2$, $P_3$ lie in a plane at height zero, i.e., Z=0, and with the first fixed point $P_1$ located at the coordinates (0,0,0), i.e., at the origin of the axes of the initial reference triplet IRS. Consequently, an operation of change of reference system is necessary.

According to the method, the distances b, d, a between the pairs of fixed points $P_1$, $P_2$, $P_3$ are calculated:

$$d=\overline{P_1P_2}=1358$$

$$b=\overline{P_2P_3}=1088$$

$$a=\overline{P_3P_1}=898$$

Figure 2:
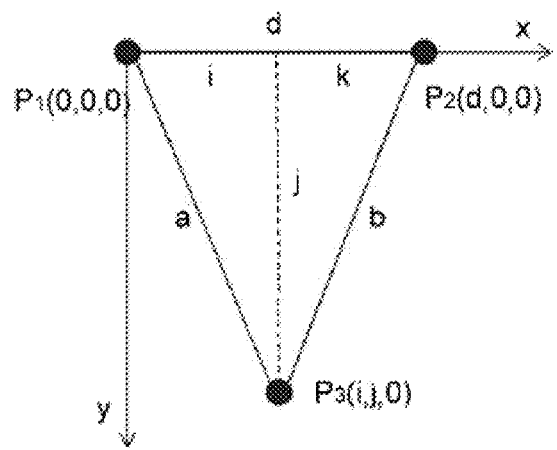

The above distances b, d, a may be observed from the top plan view of the arrangement of the receivers $R_1$, $R_2$, $R_3$ as illustrated in FIG. 2, where the axis x ranges from $P_1$ to $P_2$ and the axis y from $P_1$ downwards.

On the basis of the triangle identified by $P_1$, $P_2$, $P_3$ by applying the Pythagoras' theorem, the following system in the i, k unknowns is obtained:

$$\begin{cases} a^2 - i^2 = b^2 - k^2(=j^2) \\ i+k = d \end{cases}$$

where i and k are the semibases of the triangle identified by the fixed points $P_1$, $P_2$, $P_3$, and j is the height thereof.

We find $$k = \frac{b^2 + d^2 - a^2}{2d}$$

$$i = d - k$$

$$j = \sqrt{a^2 - i^2}$$

We now pass from the generic coordinates of the initial reference system IRS to the new reference system with plane Z=0 and with the point $P_1$ at the origin (designated by TRS in FIG. 4), starting from the distance between the fixed points $P_1$, $P_2$, $P_3$, which, in the new reference system, is $$P_1(0,0,0)=(0,0,0)$$

$$P_2(d,0,0)=(1358,0,0)$$

$$P_3(i,j,0)=(540,717,0)$$

Also in this case, the numeric values assumed in the example here considered are indicated.

The distances $r_1$, $r_2$, $r_3$ between the transmitter T and the receivers $R_1$, $R_2$, $R_3$ being known and the reference system having been changed from the initial reference system IRS to a second reference system, or trilateration reference system TRS, suited for implementation of the trilateration procedure with simplified equations, as set forth above, it is possible to make the representation appearing in FIG. 3 of the fixed points $P_1$, $P_2$, $P_3$, which refers to the trilateration procedure in a general sense, which envisages identifying the intersection of the surfaces of three spheres by formulating the equations of the surfaces of the three spheres and then solving the equations for the three unknowns x, y, and z.

Passage of the reference system from the initial reference system IRS to the trilateration reference system TRS by setting the first fixed point $P_1$ at the origin, as has been said, serves to simplify the calculation of the system.

The result is the following system in the unknowns x, y, z:

$$\begin{cases} r_1^2 = x^2 + y^2 + z^2 \\ r_2^2 = (x-d)^2 + y^2 + z^2 \\ r_3^2 = (x-i)^2 + (y-j)^2 + z^2 \end{cases}$$

By solving this system the values of the unknowns x, y, z are obtained that identify the mobile point $P_z$ in the trilateration reference system TRS $$x = \frac{r_1^2 - r_2^2 + d^2}{2d}$$

-continued $$y = \frac{r_1^2 - r_3^2 + i^2 + j^2}{2j} - \frac{ix}{j}$$

$$z = \pm\sqrt{r_1^2 - x^2 - y^2}$$

As has been mentioned, given the expression of the coordinate z, we obtain in actual fact two points $P_{Z+}$ and $P_{Z-}$, represented in FIG. 4, which shows the positions of the receivers and of the transmitter in the trilateration reference system TRS. The aforesaid two points $P_{Z+}$ and $P_{Z-}$ are in positions opposite to the plane Z=0 passing through the three fixed points:

$$P_{Z+}(x,y,z+)=(-201,-84,1546)$$

$$P_{Z-}(x,y,z-)=(-201,-84,-1546)$$

The points calculated are referred to the triplet having plane Z=0 with $P_1$ in the origin, it is therefore now necessary to return to the initial reference system IRS by applying a rototranslation matrix R.

In general, it is known that any isometry in space can be expressed by the following system $$\begin{cases} x' = a_1 x + b_1 y + c_1 z + d_1 \\ y' = a_2 x + b_2 y + c_2 z + d_2 \\ z' = a_3 x + b_3 y + c_3 z + d_3 \end{cases}$$

which in matrix form becomes:

$$\begin{bmatrix} x' \\ y' \\ x' \\ 1 \end{bmatrix} = \begin{bmatrix} a_1 & b_1 & c_1 & d_1 \\ a_2 & b_2 & c_2 & d_2 \\ a_3 & b_3 & c_3 & d_3 \\ 0 & 0 & 0 & 1 \end{bmatrix} \cdot \begin{bmatrix} x \\ y \\ z \\ 1 \end{bmatrix}$$

where the submatrix 3×3 in a, b, c is an orthogonal matrix, in the case in point of rotation. The 3×1 subvector in the variable d represents the translation, and the 1×4 subvector (last row) is constant. In compact form we have:

$$P'^{4\times 1} = R^{4\times 4} \cdot P^{4\times 1}$$

Wherein $P'^{4\times 1}$ is the vector of the coordinates in the arrival system, $P^{4\times 1}$ is the vector of the coordinates in the starting system, and $R^{4\times 4}$ the rototranslation matrix.

To make the transformation referred to above it would be necessary to know the angles of rotation about the axes (Euler angles) and the translation vector.

The method according to the invention instead envisages, according to a main aspect, calculating the rototranslation matrix R in reverse, once the initial and final positions (i.e., in the reference systems TRS and IRS, respectively, of four points $P_1$, $P_2$, $P_3$, $P_4$) are known.

In matrix form we thus have $$\begin{bmatrix} x'_1 & x'_2 & x'_3 & x'_4 \\ y'_1 & y'_2 & y'_3 & y'_4 \\ z'_1 & z'_2 & z'_3 & z'_4 \\ 1 & 1 & 1 & 1 \end{bmatrix} = \begin{bmatrix} a_1 & b_1 & c_1 & d_1 \\ a_2 & b_2 & c_2 & d_2 \\ a_3 & b_3 & c_3 & d_3 \\ 0 & 0 & 0 & 0 \end{bmatrix} \cdot \begin{bmatrix} x_1 & x_2 & x_3 & x_4 \\ y_1 & y_2 & y_3 & y_4 \\ z_1 & z_2 & z_3 & z_4 \\ 1 & 1 & 1 & 1 \end{bmatrix}$$

or in compact form $$P'^{4\times 4} = R^{4\times 4} \cdot P^{4\times 4}$$

The aforesaid rototranslation matrix R must be obtained by inverting the matrix P of the positions of the points in the trilateration reference system TRS, as follows (the size of the matrix is omitted):

$$R = P' \cdot P^{-1}$$

It thus appears evident why four points are required; otherwise, the matrix P of the positions of the points in the system TRS would be non-invertible. Since in the case under examination in actual fact only three points are available, because there are three receivers, consequently, the fourth point $P_4$ must be obtained by combining the previous three fixed points $P_1$, $P_2$, $P_3$. It is important to emphasize that the fourth point $P_4$ cannot be a linear combination of the other three; i.e., it cannot lie in the same plane; otherwise, the matrix P is non-invertible.

The operation of extraction of the fourth point $P_4$ via combination is obtained by applying, for example, the following criteria:
 the point $P_4$ lies on a straight line perpendicular to the plane passing through the three fixed points $P_1$, $P_2$, $P_3$;
 the point $P_4$ passes through a midpoint $P_m$ between the three fixed points $P_1$, $P_2$, $P_3$;
 the point $P_4$ is at a distance from the midpoint $P_m$ that corresponds to the mean distance between the three fixed points $P_1$, $P_2$, $P_3$.

Specifically, in order to identify the fourth point $P_4$ the first step is to calculate the equation of the plane π passing through the three fixed points, i.e.:

$$\pi: ax + by + cz + d = 0$$

The above cartesian equation is obtained by developing the determinant of the matrix:

$$\begin{vmatrix} x - x_1 & y - y_1 & z - z_1 \\ x_2 - x_1 & y_2 - y_1 & z_2 - z_1 \\ x_3 - x_1 & y_3 - y_1 & z_3 - z_1 \end{vmatrix} = 0$$

i.e., by calculating the subdeterminants thereof:

$$a_D = \begin{bmatrix} y_2 - y_1 & z_2 - z_1 \\ y_3 - y_1 & z_3 - z_1 \end{bmatrix}$$

$$b_D = \begin{bmatrix} x_2 - x_1 & z_2 - z_1 \\ x_3 - x_1 & z_3 - z_1 \end{bmatrix}$$

$$c_D = \begin{bmatrix} x_2 - x_1 & y_2 - y_1 \\ x_3 - x_1 & y_3 - y_1 \end{bmatrix}$$

$$d_D = -(ax_1 + by_1 + cz_1)$$

Once this is done, a midpoint value $P_m$ is calculated between the three fixed points $P_1$, $P_2$, $P_3$. The parametric equation of the straight line perpendicular to the plane π and passing through the aforesaid midpoint $P_m$ is $$\begin{cases} x = x_m + a_D t \\ y = y_m + b_D t \\ z = z_m + c_D t \end{cases}$$

Once this is done, if $P_4$ is the unknown point, the value of the parameter t is determined such that the distance of the unknown point from the midpoint is equal to a distance dist, where dist is equal to the mean distance between the three fixed points, once the following, which are known:

$$\text{dist}=\sqrt{(x_4-x_m)^2+(y_4-y_m)^2+(z_4-z_m)^2}$$

i.e., $$\text{dist}=\sqrt{(a_D t)^2+(b_D t)^2+(ct)^2}$$

whence:

$$t=\frac{\text{dist}}{\sqrt{a_D^2+b_D^2+c_D^2}}$$

At this point, by substituting t in the parametric equation of the straight line, the fourth point $P_4$ is found.

Hence, once the fourth point $P_4$ is known, it is possible to carry out the steps that enable return to the initial reference system IRS, i.e., calculate the rototranslation matrix $R^{(4 \times 4)}$ that enables passage from one reference system to the other. Given the matrix P of the points, i.e., the coordinates of the points, that belong to the trilateral reference system TRS, i.e., where the set of three receivers is identified, and the matrix P' of the points that belong to the initial reference system IRS, as has been said, the rototranslation matrix R is calculated by multiplying the trilateral matrix P' by the inverse of the matrix P of the initial points.

$$P'=R \cdot P \to R=P' \cdot P^{-1}$$

The matrices P and P' now comprise four points, the position of which is known in both of the reference systems, the first three corresponding to the positions of the receivers, the fourth being calculated as a geometrical locus to be calculated in the two reference systems, using the first three points.

The matrices P and P', in the case of the example, are given below (where the points $P_1$, $P_2$, $P_3$, $P_4$ appear in the columns). Given that the matrix must be 4×4, a last row set to 1 is added:

$$P=\begin{bmatrix} 0 & 1358 & 540 & 632 \\ 0 & 0 & 717 & 239 \\ 0 & 0 & 0 & 1268 \\ 1 & 1 & 1 & 1 \end{bmatrix}$$

$$P'=\begin{bmatrix} 3307 & 3288 & 5293 & 2028 \\ 610 & -447 & 640 & 274 \\ 1710 & 2562 & 2607 & 2273 \\ 1 & 1 & 1 & 1 \end{bmatrix}$$

whence, after the matrix P of the positions is inverted in the trilateral reference system TRS, the rototranslation matrix R is obtained $$R=\begin{bmatrix} -0.014 & -0.009 & -0.1 & 3307 \\ -0.778 & 0.628 & 0.005 & 610 \\ 0.628 & 0.778 & -0.016 & 1710 \\ 0 & 0 & 0 & 1 \end{bmatrix}$$

By applying the rototranslation matrix R to the two points found for the transmitter T, Pz+ and Pz−, we thus pass from the reference system of the transmitters to the initial reference system.

$$P_{z+}=\begin{bmatrix} -201 \\ -84 \\ 1546 \\ 1 \end{bmatrix} \to P'_{z+}=\begin{bmatrix} 1765 \\ 722 \\ 1494 \\ 1 \end{bmatrix}$$

$$P_{z-}=\begin{bmatrix} -201 \\ -84 \\ -1546 \\ 1 \end{bmatrix} \to P'_{z-}=\begin{bmatrix} 4856 \\ 706 \\ 1543 \\ 1 \end{bmatrix}$$

As anticipated, there are two possible positions for the transmitter T, one opposite to the other with respect to the plane passing through the receivers. From the context, one of the two points found can be excluded.

In the case proposed, it will always be necessary to take into account the points having a height x smaller than that of the initial reference system IRS, which, as has been said, preferably coincides with the robot triplet, as illustrated in FIG. 4.

Illustrated in FIG. 5 is a flowchart that summarizes the main operations of the trilateration procedure used by the locating method according to the invention, designated by the reference number 100.

In a step 110, a change of reference is made from the first reference system IRS of the three fixed points $P_1$, $P_2$, $P_3$ to a second reference TRS system in order to reach the conditions of applicability of the trilateration formula (plane Z=0).

In a step 120, the trilateration formula is applied. The position of the unknown point $P_z$, in particular associated to the transmitter T, is obtained with respect to the trilateration reference system TRS, which is simplified: plane Z=0.

In a step 130, rototranslation of the point $P_z$ found is carried out from the trilateration reference system TRS into the initial reference system IRS. The corresponding rototranslation matrix R is calculated using the positions in the initial reference system IRS and in the trilateration reference system TRS of the three fixed points.

In FIG. 6, designated by the reference 200 is a black-box, or input-output, representation of the method.

Supplied at input are the coordinates $x_1$, $y_1$, $z_1$, $x_2$, $y_2$, $z_2$, $x_3$, $y_3$, $z_3$ of the fixed points $P_1$, $P_2$, $P_3$, in the initial reference system, which may be any reference triplet, and the distances $r_1$, $r_2$, $r_3$ measured via measurement of the times of flight of the ultrasound signals, and supplied at output, once again in the initial reference system, are the coordinates $x_p$, $y_p$, $z_p$ of the position of the transmitter T, i.e., of the mobile point $P_z$. The so-called black box implements, for example, the procedure 100, or, conversely, we can say that the inputs of FIG. 6 can be supplied as inputs to step 110 of the method 100 of FIG. 5.

The advantage of the method proposed is that we get away from the initial reference system, which can thus be any, instead of having to impose conditions on the initial positioning of the receivers that will make it possible to operate in a simplified reference system.

This, as has been mentioned, is particularly advantageous in the case where more than three fixed points are available. In the case of four fixed points, the calculation can be replicated four times (excluding, that is, one point at a time) and the final value of the unknown point can be obtained as average of the four respective calculations using the procedure 100.

In the case of six fixed points, for example, there are twenty possible combinations; taking the average of the measurements the uncertainty of measurement is reduced.

Figure 8A:
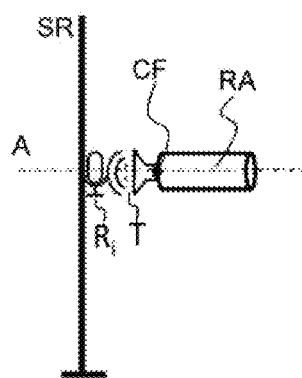
FIGS. 8a and 8b are schematic illustrations of a configuration of the system designed to carry out a calibration procedure associated to the locating method according to the invention.
Figure 8B:
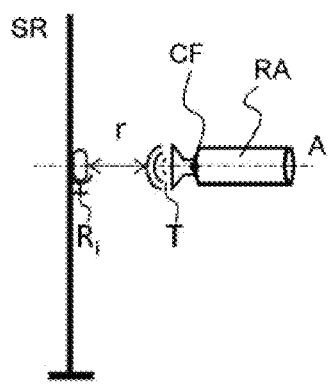

A calibration procedure used by the method according to the invention is now described, with reference to FIGS. 8a and 8b.

An ultrasound measuring system like the one described with reference to FIG. 1, in general, yields the time of flight between when the emitter or transmitter T emits the ultrasound signal and when the i-th receiver $R_i$ receives the above signal propagated in space. The result is affected by environmental factors (basically, temperature). In fact, the speed of sound v (expressed in m/s) varies according to the temperature Temp (in ° C.) according to the relation $$v = 331.4 + 0.062 \cdot \text{Temp}$$

Moreover, the electronic control system LC that controls the system of ultrasound transmitters and receivers induces a systematic delay, i.e., an offset in the measurement that can be equated with a constant.

In the case of the example, the ultrasound system measures a number of cycles (in particular, of the driving control unit or control system LC) between emission of the ultrasound signal and its reception, where each cycle in the example described here has a duration of 1.085 μs. Consequently, a distance dCalc, in this case expressed in millimeters, calculated between the emitter T and the receiver $R_i$ is equal to $$dCalc = \frac{(Cy + Oft) \cdot 1.085 \cdot (331.4 + 0.62 \cdot \text{Temp})}{1000}$$

where Cycles is the number of cycles measured and Oft the number of offset cycles introduced by the electronics, i.e., for example by the module LC.

In order to calibrate the system, i.e., basically calculate the offset Oft introduced by the electronic control system, it is envisaged to carry out a calibration procedure that uses a robot RA for objectivizing the relative position between the transmitter T and each receiver $R_i$. As has been mentioned, by "objectivization" of the position is meant referencing of the measurements to position values calculated with respect to the robot base triplet.

The aforesaid procedure comprises in the first place:
positioning the transmitter T on the flange CF of a robot RA and a receiver $R_i$ on a support SR, as illustrated in FIG. 8a, i.e., at one and the same height so as to vary the distance only along just one horizontal axis A; and then
acquiring the response of the system, varying a measurement distance dMeas between the transmitter T and the receiver $R_i$, in axis with the sensors, in particular within a defined range, for example from 300 to 1700 mm, and with a given step, for example 100 mm; in the case tested provided by way of example, the results are those appearing in Table 1 below

TABLE 1

| | dMeas [mm] | | | | | | | | | | | | | | |
|---|---|---|---|---|---|---|---|---|---|---|---|---|---|---|---|
| | 300 | 400 | 500 | 600 | 700 | 800 | 900 | 1000 | 1100 | 1200 | 1300 | 1400 | 1500 | 1600 | 1700 |
| Cy | 551 | 817 | 1092 | 1355 | 1623 | 1887 | 2158 | 2423 | 2693 | 2963 | 3231 | 3498 | 3766 | 4032 | 4302 | where dMeas is the known measurement distance to which each time the flange CF of the robot RA displaces, along the horizontal axis A, while Cy is the number of cycles measured for each value of measurement distance dMeas.
calculating then a deviation Δ, once again in millimeters, between the values calculated dCalc on the basis of the cycles Cy and the values of the measurement distance dMeas from the robot $$\Delta = dCalc - dMeas$$

It is then envisaged to minimize this deviation Δ, first with respect to the environmental factors, and then with respect to the delay or offset Oft introduced by the control unit.

As regards minimization of the deviation due to environmental factors, the first step of the aforesaid minimization envisages setting in the formula appearing above the offset Oft in the expression of the distance calculated dCalc at zero and calculating the deviation Δ between the values calculated and measured as the environmental temperature Temp varies (around the presumed temperature). Appearing in FIG. 12 are the corresponding values.

Figure 12:
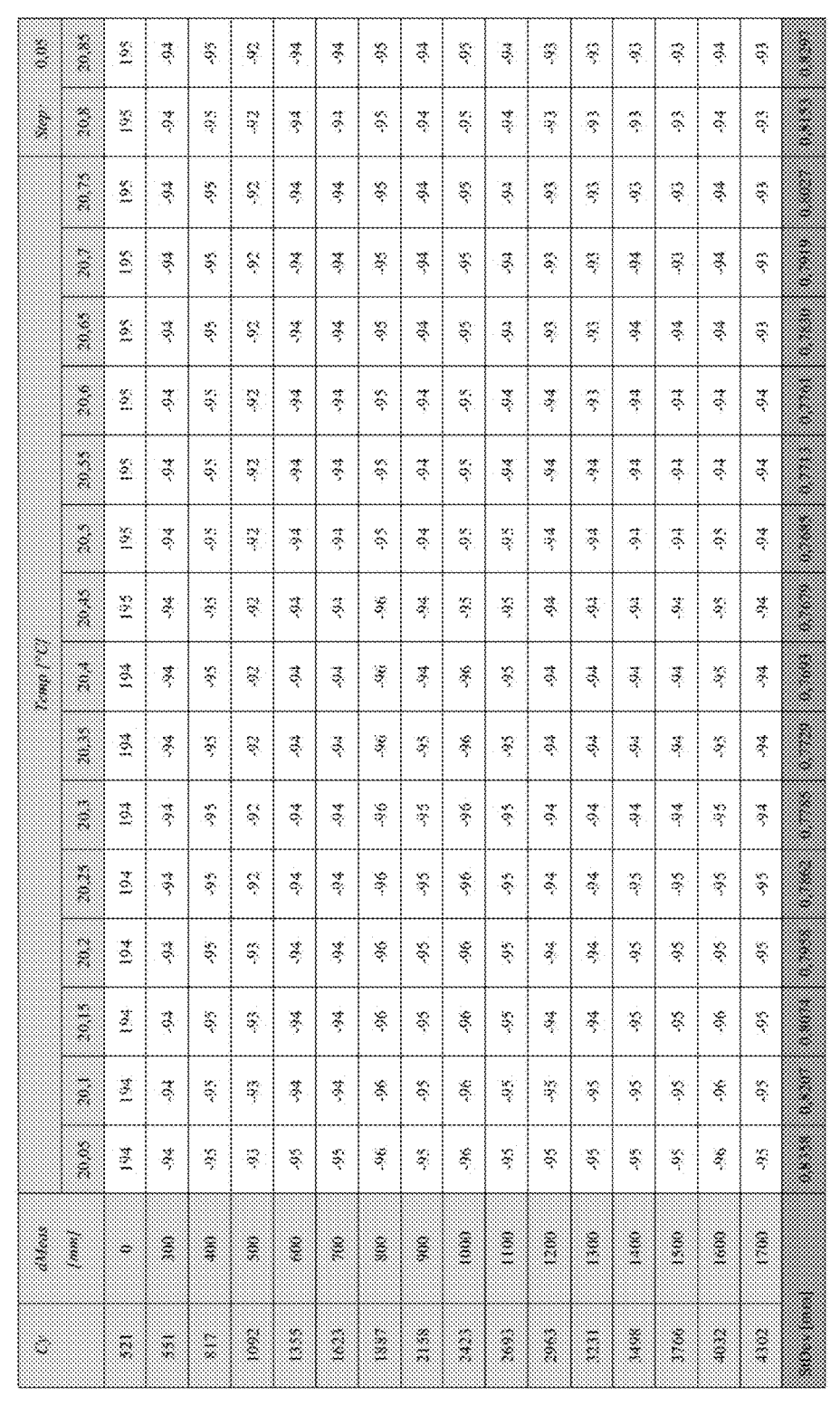

Appearing in the last row of FIG. 12 is the standard deviation StDev of the difference between the values calculated and the values measured as the temperature varies.

Appearing in the first and second columns are the cycles Cy and the measurement distance dMeas, as in the rows of the previous Table 1. In this case, each row, apart from the last row, corresponds to a different point of calibration measurement, i.e., to a value of measurement distance dMeas at which the robot RA has set itself.

Appearing in the other columns are the values of the deviations Δ at different temperature values Temp. The optimal value of the temperature Temp is the minimum one, which corresponds to a temperature of 20.45° C.

Then, following upon the step of minimization of the deviation due to the environmental parameters, it is envisaged to carry out a step of minimization of the deviation due to the offset.

This step envisages repeating the calculations, once the temperature is fixed at 20.45° C., as the offset varies.

Figure 13:
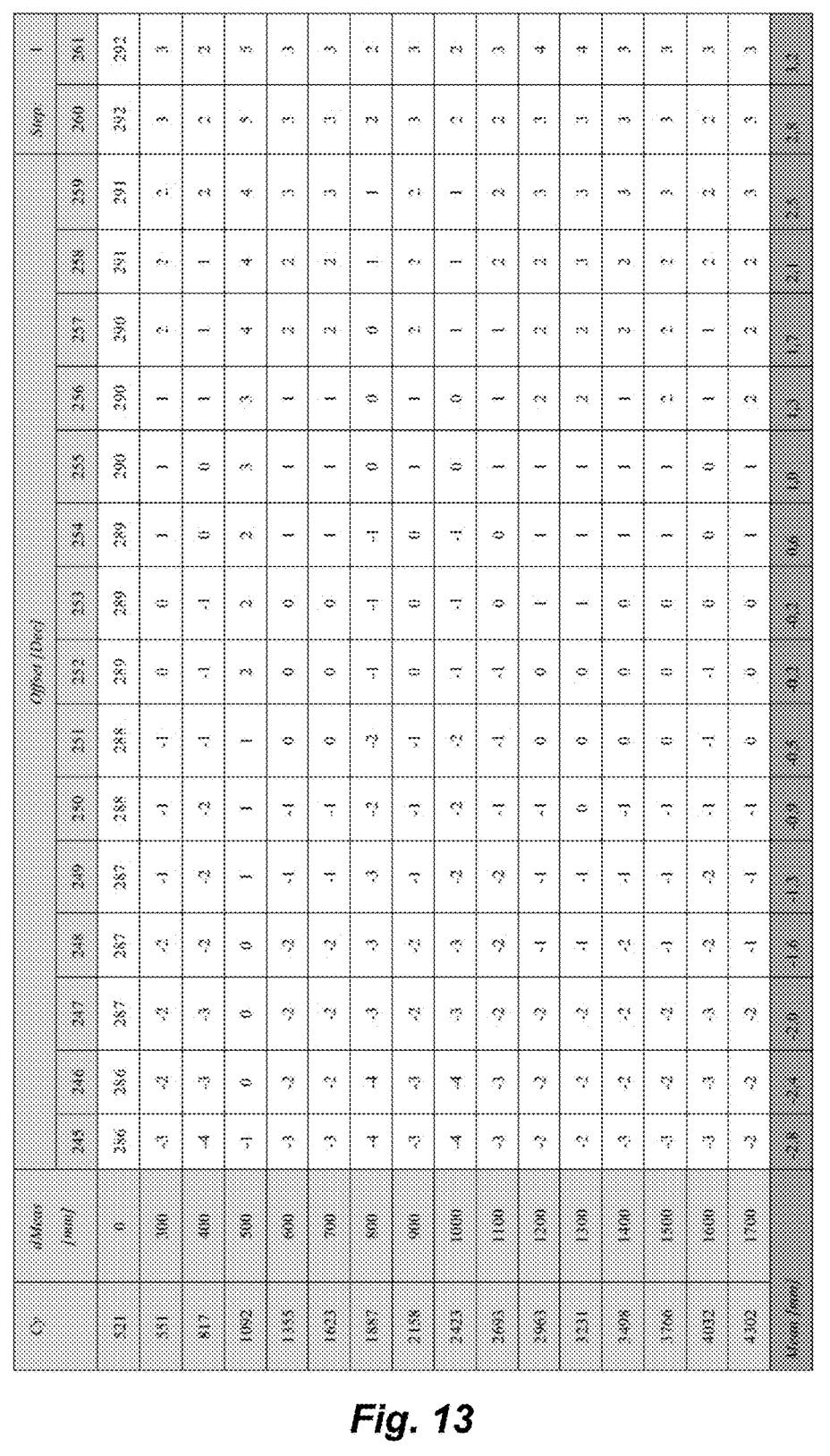

The corresponding values appear in FIG. 13, which has a structure similar to that of FIG. 12, but in the columns where in FIG. 12 the deviation Δ at different temperatures Temp appeared, there here appear the offset values Oft at different temperatures Temp.

Appearing in the last row of FIG. 13 is the mean Mean, expressed in millimeters, of the difference between the values calculated and those measured as the offset varies. The optimal value is a zero-mean one, which corresponds to an offset Oft of 253 cycles.

Consequently, for all the measurements that are effected with the system described by way of example undergoing calibration the offset Oft is then set equal to 253 cycles.

Of course, the variation due to the environmental factors changes in time. In this regard, it is possible to make a measurement of the time of flight on a known and experimentally repeatable distance. Then, by repeating the measurement, i.e., by recreating the known distance between the emitter and the receiver, it is possible to recalculate the effective temperature that brings this distance back to the known distance.

Figure 7:
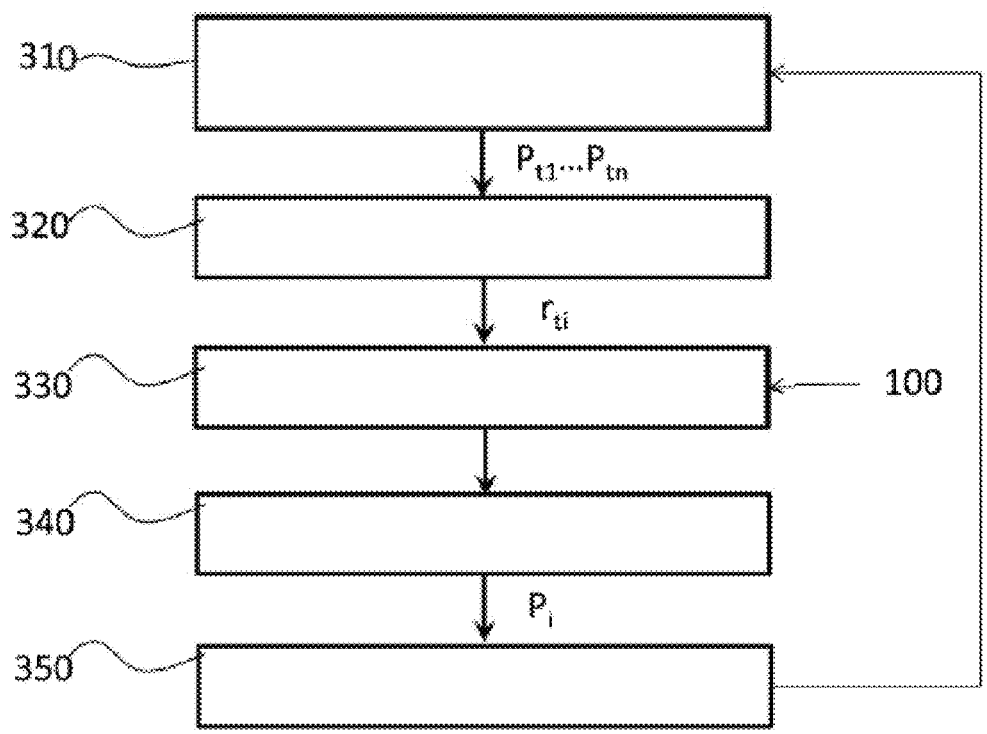
FIG. 7 presents a flowchart illustrating a procedure of definition of points within the method according to the invention.

There now follows a description, with reference to FIG. 7, of a procedure for exact measurement of the position coordinates of the fixed points of the receivers, which serve as reference values in the trilateration calculation.

Location via trilateration of the ultrasound transmitter T envisages knowing the position of the receivers $R_i$ with respect to any reference triplet of axes, for example the triplet of the initial reference system IRS of FIG. 1. The precise measurement of the position of each i-th receiver $R_i$ markedly affects the precision of the results of the locating method; however, it is not easy to make.

Figure 9:
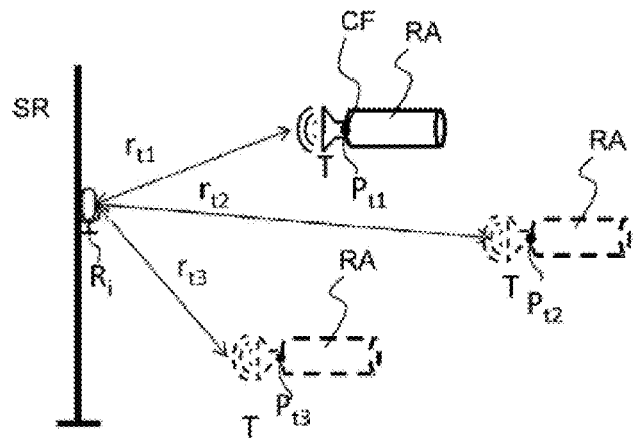
FIG. 9 is a schematic illustration of a configuration of the system designed to implement a procedure for measuring fixed points that is associated to the locating method according to the invention.
Figure 10:
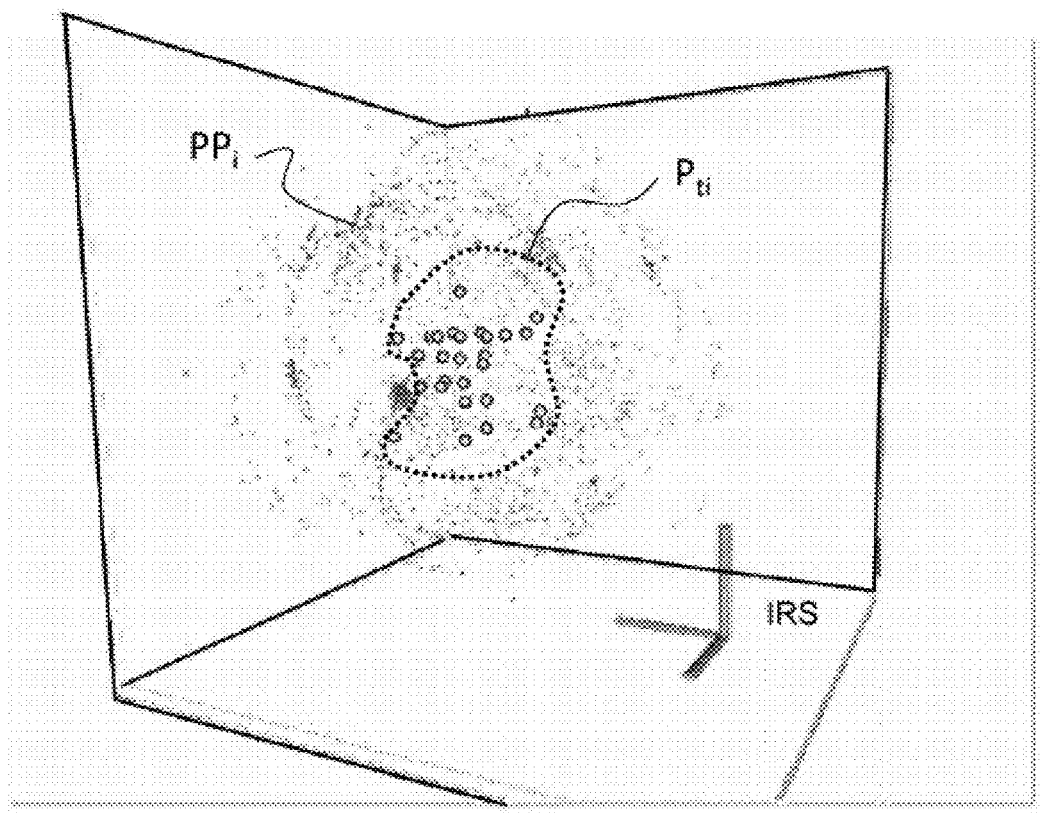
FIGS. 10 and 11 are diagrams illustrating steps of the aforesaid procedure for measuring fixed points.

Illustrated hereinafter with reference to FIG. 9 is a procedure for measuring the position of each i-th receiver $R_i$ by exploiting the objectivized position of the transmitter T, positioned on the flange of a robot, such as the robot RA of FIG. 8a or FIG. 8b, and the trilateration-locating method described according to the invention.

Hence, it is envisaged to position, for example, four receivers in front of the robot in a random and unknown position.

The ensuing method serves to define the position of the receivers one at a time. In practice, the trilateration procedure is exploited, for example in the embodiment 100 of FIG. 5, but in reverse way. In other words, it is envisaged to displace the robot RA into at least three different positions $P_{t1}$, $P_{t2}$, $P_{t3}$, which are known because, via the control module of the positioning of the robot RA, the position of flange centre CF of the robot RA that displaces the transmitter T is known, and to calculate the three corresponding times of flight, to obtain three distances $r_{t1}$, $r_{t2}$, $r_{t3}$ referred to emissions in different positions of the robot triplet. The position of the receiver R with respect to the robot triplet is then derived.

Since the trilateration procedure according to the invention is used in a reverse way, moreover, in the example discussed here four receivers are illustrated, but it is clear that the minimum number of receivers usable in the procedure for measuring the position of each i-th receiver $R_i$ is once again three.

In order to improve the precision of the measurement, to estimate the position of each receiver with respect to the robot triplet, there are preferably acquired many positions $P_{ti}$ of the transmitter T, for example 28 positions of the $P_{ti}$ transmitter T. By then combining their positions three by three (3276 combinations in the example) 3276×2 possible positions $PP_i$ of the receiver $R_i$ are extracted, represented in FIG. 12 as a cloud of dots, half of which are false positions. In fact, as explained previously, the trilateration formula always extracts two points, one opposite to the other with respect to the plane passing through the reference points. Since it is too laborious to verify manually which are correct and which are not, the consideration is exploited that the points that are correct, i.e., not false, must be closer to one another.

The 28 positions $P_{ti}$ of the transmitter T are represented in FIG. 12 with larger white circles within the cloud of possible positions $PP_i$.

Consequently, to implement the above consideration, the midpoint between the possible points $PP_i$ is calculated, for example 3276×2 (the distance of the possible small points $PP_i$ from any point may be considered since in any case the points that have values of distance similar to one another are subsequently selected), and the distance is calculated between each possible point and the midpoint. In general, a set of points will be found, approximately half of the total, close to a value of minimum distance, which are the correct points, whilst the other half will substantially be at greater values of distance.

Once the correct points have been extracted, the mean value thereof is calculated, which is taken as measured position value. In particular, since the correct points are close to one another, it would be computationally burdensome to calculate the distance between one point and another, and it is consequently preferable to proceed as follows: the distance of the points from any point is calculated; the true ones are close, and hence they have practically the same numeric value. The correct ones are exactly one half, but considering that the method is empirical, it is subject to errors. Hence, only one quarter of the points are preferably taken.

The same steps are followed for the remaining three receivers. The result is the measured positions $P_{m1}$, $P_{m2}$, $P_{m3}$, $P_{m4}$ represented in FIG. 13.

Hence, to sum up, with reference to the flowchart of FIG. 6, an example of procedure for measuring the fixed points 300 comprises:
  a) a step 310 of positioning the transmitter T in a number n of different known points ($P_{t1}$ ... $P_{tn}$) in space, with a minimum value of n equal to 3, for example mounting the transmitter T on a robot RA, the position of which is objectivized;
  b) a step 320 of calculation, using the times of flight as described, of the distance $r_{ti}$ between the transmitter T, in the n positions or points ($P_{t1}$ ... $P_{tn}$), and a given receiver $R_i$;
  c) a step 330 of application of the trilateration procedure according to the invention, for example the procedure 100 of FIG. 5, for each triplet, or combination three by three of the n positions ($P_{t1}$ ... $P_{tn}$) assumed by the transmitter T to obtain corresponding position values of the given receiver $R_i$;
  d) a step 340 of calculation of average on the position values obtained for the given receiver $R_i$ so as to obtain the respective position $P_i$; and
  e) a step 350 of repetition of the procedure (steps a-d) for each given receiver $R_1$.

With the measurement procedure 300, the fixed points, i.e., the ultrasound receivers, can hence be positioned "randomly" in space, and their position can be identified without measuring it directly, with a consequent evident advantage of convenience of installation. If we assume mounting the fixed points on a transportable rigid structure, designated by SR in FIG. 9 (or in FIGS. 8a and 8b), the procedure 300 can be applied in a point different from the final one. The aforesaid rigid structure SR may be a wall, or else a metal frame, or some other rigid support.

Hence, the advantages of the method according to the invention emerge clearly.

The method according to the invention advantageously makes it possible to get away from the reference system, which may thus be any and hence may be defined at will.

The method according to the invention is particularly advantageous in the case where more than three fixed points, or receivers, are available in so far as it enables replication of the calculation on triplets of points, thus reducing the uncertainty of measurement via averaging operations.

The method according to the invention, via a procedure of definition of the fixed points that exploits the engine itself for calculation of location, i.e., trilateration, advantageously enables a random positioning, or in any case a less accurate positioning, of the receivers in space and identification of their position without measuring it directly, by exploiting the times of flight of ultrasound waves. In a particularly advantageous way, it is possible to mount the receivers on a transportable rigid structure and define their position in the aforesaid structure in a point different from that of the effective work space in which they are used.

The above procedure of definition of the position of the receivers moreover reflects advantageously on the precision of location of the transmitter that depends on the procedure itself.

Of course, without prejudice to the principle of the invention, the details of construction and the embodiments may vary widely with respect to what has been described purely by way of example herein, without thereby departing from the scope of the claims.

The system that implements the method according to the invention may be used in various applications in which it is necessary to know the position of a tool in a work space.

The transmitter can thus be mounted on a wrench, as described, or a welding yoke, or any other tool that has to operate on a component in pre-set positions. In the case where there are a number of receivers available, they can be located in strategic positions, thus creating a plurality of measurements. As has been mentioned, the receivers must always be three by three in a combinational manner, of which the average may be computed, either eliminating or not the values furthest from the mean value.

Another case of industrial application of interest is the real position assumed by the flange of a robot. In fact, the environmental factors and the mechanical distortions of the axes and of the joints due to the weight cause the position indicated by the control of the robot to be erroneous, even by values in the order of centimeters. An ultrasound transmitter set in a strategic way at the flange centre or in its proximity yields a feedback that can be used for feedback of the robot helping it to reach the correct position.

The method according to the invention is applied to applications in which the tool moves automatically, via a machine or a robot. The method according to the invention may be applied also to tools operated manually by a human operator.

The method according to the invention may be implemented via one or more computers, or microprocessor cards, or microcontrollers. In particular, a single control module may be provided, on a card or microprocessor, which implements the method of calculation of the position and control of the ultrasound measurement system.

What is claimed is:

1. A method for locating a tool in a work space via ultrasound, comprising:
    associating at least one ultrasound transmitter to said tool and calculating a position of said tool on the basis of determination of the position of said transmitter;
    providing at least three ultrasound receivers, set in fixed positions relative to said work space, which are configured for receiving ultrasound signals emitted by said ultrasound transmitter; and
    measuring, in a first reference system, distances between said ultrasound transmitter and said at least three ultrasound receivers on the basis of propagation times associated to said ultrasound signals received,
    said calculation of the position of the transmitter comprising using a trilateration procedure comprising applying trilateration formulas as a function of said measured distances and of said fixed positions,
    said trilateration procedure comprising:
    carrying out a change of reference of the fixed positions of said at least three receivers to reference them in a second simplified reference system in which said fixed positions lie in a plane associated to a zero value of position coordinate;
    applying said trilateration formulas to obtain the position of an unknown point in said second simplified reference system as a function of said measured distances and of said fixed positions expressed in said second simplified reference system;
    carrying out a rototranslation of the position of the unknown point obtained from the second simplified reference system into the first reference system, a corresponding rototranslation matrix being calculated as a function of the fixed positions and of a fourth point obtained by combining the previous three fixed positions, said combination of said previous three fixed positions being selected so that said fourth point lies outside of the plane defined by said three fixed positions, in the first reference system and in the simplified reference system; and
    using a position of said unknown point obtained following upon said rototranslation as position of said transmitter.

2. The method according to claim 1, wherein said operation of rototranslation comprises obtaining position coordinates of said fourth fixed point via a step of geometrical construction that comprises making a combination of the coordinates of the fixed positions, both in the first reference system and in the simplified reference system, and adding said position coordinates of the fourth fixed point to the coordinates of the fixed positions in a respective position matrix in the first reference system and a position matrix in the simplified reference system.

3. The method according to claim 2, wherein said step of obtaining position coordinates of a fourth fixed point via a step of geometrical construction comprises imposing that:
    the fourth point lies on a straight line perpendicular to the plane passing through the three fixed points;
    the fourth point ($P_4$) passes through a midpoint of the three fixed points; and
    the fourth point is set apart from the midpoint by the mean distance between the three fixed points.

4. The method according to claim 1, further comprising:
    using a set of receivers greater than three;
    implementing the method for each set of three receivers in said set of receivers to calculate a respective position value of said transmitter; and
    averaging the position values of said transmitter in order to reduce the measurement errors.

5. The method according claim 1, further comprising a procedure for measuring the position of said fixed points comprising:
    a) positioning said transmitter in at least three known points;
    b) measuring the distance between the transmitter T, respectively in the three known points, and a given receiver;
    c) applying the trilateration procedure for each set of three known points of positions of the transmitter and obtaining corresponding position values of said given receiver;

d) averaging said values of position of said given receiver positions obtained for said receiver;

e) repeating steps from a) to d) for each given receiver of the locating system.

6. The method according to claim 5, further comprising positioning said transmitter in at least three known points associating said transmitter to a robot, the position of which is performed a referencing of the measurements to position values calculated with respect to the robot base triplet.

7. The method according to claim 5, wherein the procedure for measuring the position of said fixed points comprises mounting the receivers on a transportable rigid structure for measuring their position in said structure in a point different from the work space where they are used for locating the tool.

8. The method according to claim 1, further comprising a procedure for calibrating the ultrasound measuring system with respect to variable parameters, in particular with respect to environmental parameters, and with respect to an offset introduced by the electronic control, which comprises:

positioning the transmitter, in particular on the flange of a robot, and a receiver $R_i$, in particular on a support, at one and the same height, so as to vary the distance only along a horizontal axis;

then testing the response of the system, varying a measurement distance between the transmitter and the given receiver and acquiring corresponding measured distance values;

calculating a difference between the measured distance values and the values of measurement distance; and minimizing said difference with respect to the variable parameters, in particular first with respect to the environmental factors, then with respect to the delay or offset introduced by the electronic control.

9. A system for locating a tool in a work space via ultrasound, comprising at least one ultrasound transmitter associated to said tool and at least three ultrasound receivers, set in fixed positions relative to said work space, which are configured for receiving ultrasound signals emitted by said ultrasound transmitter, and a control module configured for measuring, in a first reference system, distances between said ultrasound transmitter and said at least three ultrasound receivers on the basis of propagation times associated to said ultrasound signals received, said system being configured for making the calculation of the position of the transmitter according to the method according to claim 1.

10. The system according to claim 9, further comprising a set of receivers greater than three.

11. The system according to claim 9, further comprising a transmitter associated to a robot configured for executing operations for calibration and/or measurement of the position of the receivers.

12. The system according to claim 9, further comprising a transportable rigid structure on which the receivers are mounted.

13. The system according to claim 9, wherein said tool is a wrench or a welding yoke.

14. The system according to claim 9, wherein said tool corresponds to elements for handling a tool, for example a robot-arm flange.

15. A computer-program product that can be loaded directly into the memory of at least one computer and comprises portions of software code for implementing the method according to claim 1.

* * * * *